US005591363A

United States Patent [19]
Amos et al.

[11] Patent Number: 5,591,363
[45] Date of Patent: Jan. 7, 1997

[54] OPTIMIZED WELDING TECHNIQUE FOR NIMOV ROTORS FOR HIGH TEMPERATURE APPLICATIONS

[75] Inventors: Dennis R. Amos, Rock Hill, S.C.; Jianqiang Chen, Winter Springs, Fla.

[73] Assignee: Westinghouse Electric Corporation, Pittsburgh, Pa.

[21] Appl. No.: 398,182

[22] Filed: Mar. 2, 1995

[51] Int. Cl.⁶ .................................................. B23K 9/04
[52] U.S. Cl. .............................. 219/137 PS; 29/889.21; 219/76.12
[58] Field of Search .................. 219/137 PS, 137 R, 219/76.12, 76.14, 76.15; 29/889.1, 889.2, 889.21

[56] References Cited

U.S. PATENT DOCUMENTS

| | | | |
|---|---|---|---|
| 3,925,634 | 12/1975 | Mulder | 219/137 R |
| 4,633,554 | 1/1987 | Clark et al. | 219/137 R |
| 4,893,388 | 1/1990 | Amos et al. | 29/156.8 R |
| 4,897,519 | 1/1990 | Clark et al. | 219/76.14 |
| 4,903,888 | 2/1990 | Clark et al. | 228/119 |
| 4,940,390 | 7/1990 | Clark et al. | 416/241 R |
| 4,958,431 | 9/1990 | Clark et al. | 29/889.1 |
| 5,024,582 | 6/1991 | Bellows et al. | 29/889.2 |

FOREIGN PATENT DOCUMENTS

| | | |
|---|---|---|
| 0202793 | 11/1986 | European Pat. Off. |
| 2122613 | 11/1972 | Germany |

OTHER PUBLICATIONS

Patents Abstracts Of Japan, vol. 10, No. 238 (M–508), Aug. 16, 1986 & JP–A–61 071186 (Ishikawajima Harima Harima Heavy Ind. Co. Ltd), Apr. 12, 1986.

*Primary Examiner*—Clifford C. Shaw
*Attorney, Agent, or Firm*—M. G. Panian

[57] ABSTRACT

A process of depositing layers of weld metal onto a ferrous NiMoV low alloy steel turbine component. During a deposition of a first layer of weld metal, low levels of amperage are used to prevent a dramatic increase in a level of hardness of a heat affected zone produced during the deposition of the first layer of weld metal. During a deposition of a second layer of weld metal, higher levels of amperage are used to temper the heat affected zone but not high enough to overtemper the HAZ.

22 Claims, 3 Drawing Sheets

OPTIMIZED WELDING TECHNIQUE FOR NIMOV ROTORS FOR HIGH TEMPERATURE APPLICATIONS

FIELD OF THE INVENTION

The present invention relates to methods for repairing ferrous Nickel Molybdenum Vanadium ("NiMoV") low alloy steel steam turbine components, in particular, creep damaged or corroded surface sections of ferrous NiMoV low alloy steel steam turbine components that are subject to high temperature environments.

BACKGROUND OF THE INVENTION

In the 1950's, the power generation industry widely used ferrous NiMoV, similar to American Society of Testing Materials ("ASTM") 293 class 5 material, to make Low pressure ("LP") and High Pressure ("HP") Steam turbine components, such as rotors. Steam turbine components, including rotors, are not currently made of ferrous NiMoV alloy because this material exhibits inferior elevated temperature properties as compared to other ferrous low alloy steels such as Chromium Molybdenum Vanadium ("CrMoV").

Nevertheless, turbine components comprised of ferrous NiMoV low alloy steel are still in service in the field of power generation, some in operation for over 30 years. Due to prolonged use, NiMoV alloy turbine components, in particular, the surfaces of HP turbine rotors, may become creep damaged or corroded. Rather than replacing an entire turbine rotor, for example, the damaged sections of the rotors are generally repaired. A welding process is commonly used to perform repairs of rotors. Welding processes are generally economical and have been effective at extending the operating life of rotors.

For example, single rotor blade groove fasteners, known as steeples commonly require repair. Over time, especially in HP environments, the steeples are subject to creep, corrosion, pitting, etc. . . . It is common to machine down creep damaged or corroded steeples. Then, weld metal is deposited onto the machined surface of the rotor. Finally, the build-up of weld metal is machined to form new or repaired steeples. This process does not work well, however, for repairing steeples on ferrous NiMoV low alloy steel HP turbine component. Known welding processes have been found to weaken the heat affected ferrous NiMoV low alloy steel adjacent to the weld fusion zone making the components unusable in high pressure and elevated temperature environments.

In detail, filler or weld metal is deposited onto a creep damaged or corroded area/surface of the rotor by reusing the filler or weld metal with the surface. Gas tungsten arc welding ("GTAW"), plasma-arc welding, electron beam welding, laser-beam welding or gas metal arc welding may be used to deposit the weld metal. See, for example U.S. Pat. Nos. 4,893,388, 4,897,519, 4,903,888, and 4,940,390 which are assigned to the assignee of this application (these patents teach repairing and replacing creep damaged steeples and other damaged areas on the surface of ferrous CrMoV low alloy steel steam turbine components such as rotors and are hereby incorporated by reference for their teachings on methods of repair and welding techniques).

The first layer of weld metal deposited on the surface of a turbine component fuses with the surface of the component. The area or line between the fusion zone and base metal of a turbine component is known as the fusion line. GTAW is commonly used to deposit the first layer of weld metal. The GTAW process uses arc to fuse the weld metal to the turbine component. The arc also elevates the temperature of the base metal in the area adjacent to the fusion line.

Consequently, the microstructure and mechanical property of the base metal in this area are significantly changed. This area is known as the Heat Affected Zone ("HAZ"). A portion of the metal in this area is reaustenitised and dramatically cooled due to the welding thermal cycle causing the metal to be hardened creating a hardened sub-zone of the HAZ. The metal closest to the point of fusion is generally subject to the greatest level of hardening. On the other hand, a portion of the metal in this area is tempered during the welding thermal cycle causing the metal to be softened. This softened sub-zone of the HAZ is located farther away from the point of fusion line than the hardened sub-zone.

Using normal process of depositing layers of weld metal, it has been found that the level of hardness of ferrous NiMoV low alloy steel around the fusion line in the HAZ can be as high as 50 on a Rockwell "C" scale ("Rc"), however, the level of hardness of the softened sub-zone can be as low as 240 on a Kneep scale ("HK") (18 Rc). The normal level of hardness of ferrous NiMoV low alloy steel of a turbine component is approximately 25 Rc. Ferrous NiMoV low alloy steel with a level of hardness of 50 Rc is highly suspectable to cracking. Ferrous NiMoV low alloy steel with a level of hardness of 18 Rc has very low elevated temperature strength and very low creep resistance.

In order to relieve welding thermal induced stress and the level of hardness of the HAZ, the weld area is normally heat treated after the deposition of the layers of weld metal (postweld). In particular, ferrous NiMoV turbine components are normally heat treated at a temperature of 1200° F. (649° C.) for ten hours. After this postweld heat treatment, the level of hardness of the ferrous NiMoV low alloy steel around the fusion line in the HAZ is reduced, in some cases as low 36 Rc. It has been found that the level of hardness of the low alloy steel around the fusion line can be further reduced by using higher temperatures during the postweld treatment. Higher temperatures, however, may produce carbine coarsening or overtempering of low alloy steel in the HAZ that was not hardened or reaustenitised, i.e., softened sub-zone, during the welding process.

Overtempering further aggravates the softened sub-zone in HAZ of the low alloy steel, i.e., it further reduces the level of hardness of the softened sub-zone below the normal level of ferrous NiMoV low alloy steel; i.e., 16 Rc. This lowers the creep strength of the low alloy steel making the turbine component unusable in high pressure/temperature applications. As a consequence, it is not common to repair ferrous NiMoV low alloy steel turbine components used in HP environments using welding processes. Thus, a need exists for a repair process for worn or damaged ferrous NiMoV low alloy steel steam turbine components, such as rotors used in HP environments. In particular, a process that does not substantially affect the level of hardness of the ferrous NiMoV low alloy steel turbine component.

SUMMARY OF THE INVENTION

According to a preferred embodiment of the invention, a method is provided for repairing a surface of a ferrous NiMoV steam turbine component which does not substantially affect a level of hardness of the component. The invention includes repairing a surface of a ferrous NiMoV low alloy metal steam turbine component. The method includes depositing a first layer of weld metal on the surface using first levels of amperage, the first levels of amperage being selected to prevent a substantial increase in a level of hardness of a heat affected zone generated by the deposition of the first layer of weld metal.

The method also includes depositing a second layer of weld metal onto the first layer using second levels of amperage, the second levels of amperage being greater than corresponding first levels of amperage and being selected high enough to temper a hardened sub-zone heat affected zone and being selected low enough to not overtemper a softened sub-zone of the heat affected zone.

DETAILED DESCRIPTION OF THE PREFERRED EMBODIMENTS

Figure 1:
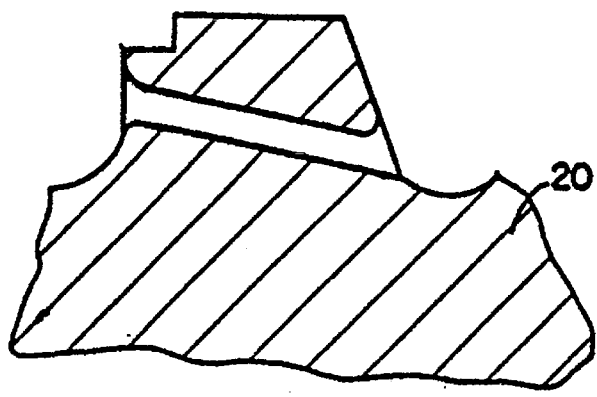
FIG. 1 (Prior Art) is a cross-sectional view of a rotor wherein the old steeples have been machined off.
Figure 2:
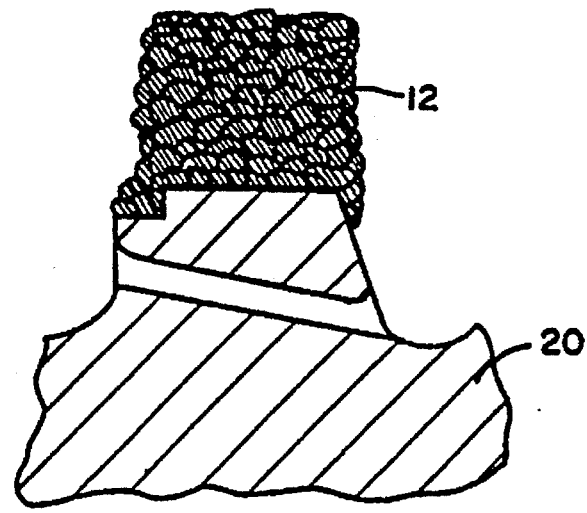
FIG. 2 (Prior Art) is a cross-sectional view of the rotor of FIG. 1, illustrating a weld build-up disposed on the machined surface.

FIGS. 1–5 (Prior Art) illustrate the formation of new steeples on steam turbine components 20, 40, and 50 using weld metal build-up processes. In detail, first, old or worn steeples are machined off using any of know procedures for removing metal such as grinding, machining, or electric arc gouging. FIG. 1 depicts a cross section of a rotor 20 where a steeple has been machined off. Next, layers of weld metal are deposited onto the surface of the rotor. The present invention provides a preferred process for depositing layers of weld metal onto a ferrous NiMoV low alloy steel turbine component. FIG. 2 depicts the rotor 20 shown in FIG. 1 after several layers of weld metal 12 have been deposited on the surface of the rotor.

Figure 3:
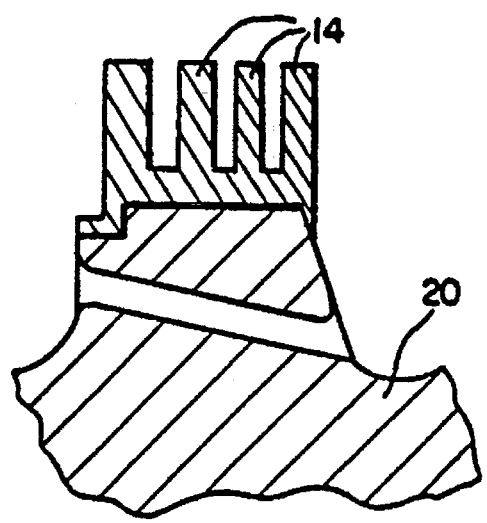
FIG. 3 (Prior Art) is a partial, cross-sectional view of the rotor of FIG. 2, illustrating machined and repaired steeples.
Figure 4:
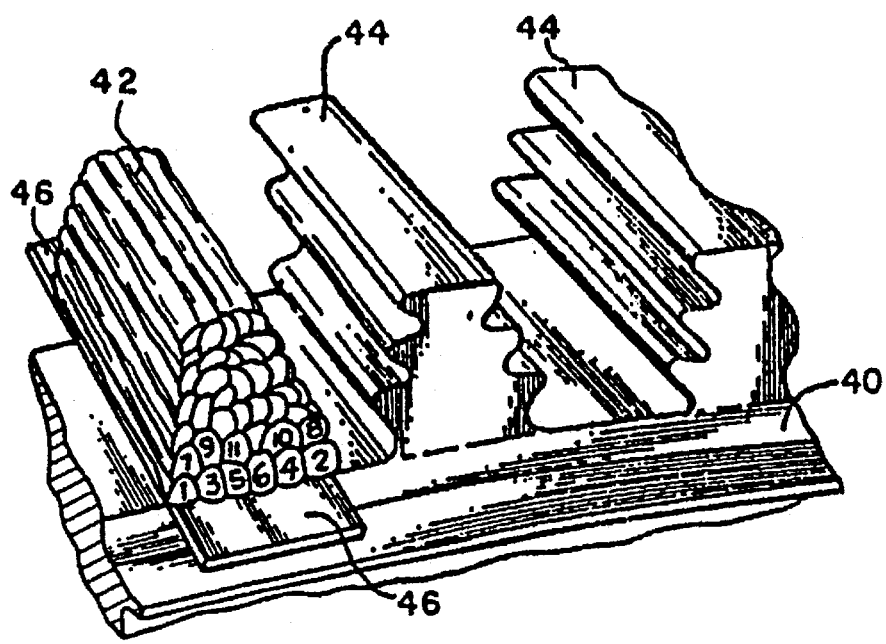
FIG. 4 (Prior Art) is a partial perspective of a single steeple repair technique, illustrating the use of run-off tab plates and bead-sequencing.

At this point, the build-up of weld metal 12 may be machined into the shape or configuration of the original steeples or other segment of the surface of the rotor 20 or turbine component that is being replaced or repaired. FIG. 3 depicts the rotor 20 with build-up of weld metal 12 shown in FIG. 2 machined into serrations 14 forming a steeple. FIG. 4 depicts a process of replacing a single worn steeple on the surface of a rotor 40.

In the steeple replacement process shown in FIG. 4, a first run-off tab 46 is disposed along a first longitudinal edge of the rotor. The first run-off tab is used to provide a starting area or surface for the deposition of weld metal 42. A second run-off tab 46 may be disposed along a second longitudinal edge of the rotor opposite the first run-off tab. The second run-off tab is used to provide an area or surface for stopping the deposition of weld metal 42. In this process, the metal weld 42 in deposited sequentially in beads which form rows and then columns (denoted as 1 to 11 in FIG. 4). The build-up of weld metal 42 is then machined into the shape or configuration (steeples) 44 of the replaced or repaired segment of the surface of the rotor 40.

Figure 5:
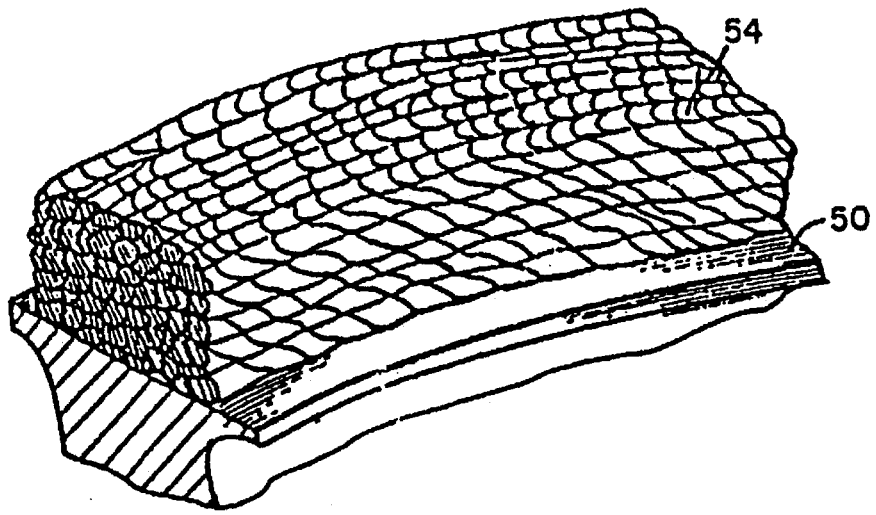
FIG. 5 (Prior Art) is a partial perspective, illustrating a 360° repair of a rotor where the steeples have been machined off and the resulting 360° weld build-up is shown.

FIG. 5 depicts another process of repairing or replacing a segment of a surface of a rotor 50. In this process, weld metal is deposited continuously around the circumference of the rotor, know as a 360° repair. The build-up of weld metal 54 may be machined into individual steeples (not shown) or form a disc (not shown) which is machined down to service tolerances of the rotor. In each of the repair processes depicted in FIGS. 1 to 5, weld metal is deposited on the surface of a rotor 20, 40, or 50 or turbine component. The process used to deposit the weld metal on the surface of the rotor is varied as a function of the metal composition of the rotor and the application or use of the repaired segment of the rotor, i.e., for LP or HP environments.

As noted above, U.S. Pat. Nos. 4,893,388, 4,897,519, 4,903,888, and 4,940,390, which are assigned to the assignee of this application, teach methods of depositing weld metal on the surfaces of components comprised of ferrous CrMoV low alloy steel. The methods of depositing weld metal taught in these patents, however, are unacceptable for NiMoV low alloy steel HP steam turbine components. The methods produce unacceptable levels of hardness of the HAZ produced during the build-up of the weld metal on the surface of ferrous NiMoV low alloy steel steam turbine components.

The present invention provides a method or process of depositing weld metal on ferrous NiMoV turbine components without producing unacceptable levels of hardness about the fusion line of the HAZ produced during the build-up of the weld metal. The metal composition of ferrous NiMoV turbine components is similar to the metal composition of ASTM 293 class 5 materials. A preferred embodiment of a weld metal build-up process for a ferrous NiMoV low alloy steel turbine component according to the present invention is described with reference to Table 1.

As shown in Table 1, the preferred process includes depositing fourteen layers of weld metal, numbered 1 to 14. After the deposition of the fourteenth layer, additional layers of weld metal may be deposited using most weld processes without substantially affecting the HAZ produced during the deposition of the first 14 layers of weld metal. It has been found that low levels of amperage must be used during the deposition of the first several layers of weld metal onto a ferrous NiMoV low alloy steel turbine component. In particular, during the deposition of the first layer of weld metal, denoted as 1 in Table 1, the lowest levels of amperage are used as compared to the levels of amperage used in the deposition of the remaining 13 layers, layers 2 to 14.

TABLE 1

| Layer | Primary | | Background | | IPM (CPM) | | Oscillation |
| --- | --- | --- | --- | --- | --- | --- | --- |
| | Amps | Volts | Amps | Volts | Primary | Background | |
| 1 | 120 | 9.0 | 85 | 8.5 | 25 (64) | 5 (13) | Y |
| 2 | 150 | 9.5 | 100 | 9.0 | 20 (51) | 5 (13) | Y |
| 3 | 150 | 9.5 | 100 | 9.0 | 20 (51) | 5 (13) | Y |
| 4 | 150 | 9.5 | 100 | 9.0 | 20 (51) | 5 (13) | Y |
| 5 | 160/180 | 11.5 | | | 18 (46) | | N |
| 6 | 190/230 | 11.5 | | | 21 (53) | | N |

TABLE 1-continued

| Layer | Primary | | Background | | IPM (CPM) | | Oscillation |
|---|---|---|---|---|---|---|---|
| | Amps | Volts | Amps | Volts | Primary | Background | |
| 7 | 190/230 | 11.5 | | | 21 (53) | | N |
| 8 | 220/260 | 11.5 | | | 24 (61) | | N |
| 9 | 220/260 | 11.5 | | | 24 (61) | | N |
| 10 | 290 | 12.0 | | | 26 (66) | | N |
| 11 | 290 | 12.0 | | | 26 (66) | | N |
| 12 | 290 | 12.0 | | | 26 (66) | | N |
| 13 | 290 | 12.0 | | | 26 (66) | | N |
| 14 | 290 | 12.0 | | | 26 (66) | | N |

It has been found that the level of hardness of the HAZ adjacent to the fusion line is increased most dramatically during the deposition of the first layer of weld metal onto the surface of the turbine component. If the first layer of weld metal is deposited using low levels of amperage, the hardened zone can be reduced or limited. In particular, for ferrous NiMoV low alloy steel turbine components, during the deposition of the first layer of weld metal, the amperage should be about 120 amperes for a deposition rate of weld metal of about 25 inches per minute ("IPM") (64 centimeters per minute ("CPM")).

It is also desirable to vary the deposition rate and amperage used during the deposition of the first layer of weld metal. As shown in table 1, in the preferred embodiment of the invention, the deposition rate is varied from about 5 IPM (13 CPM) with an amperage of about 85 amperes to a deposition rate of about 25 IPM (64 CPM) with an amperage of about 120 amperes. Finally, it is also desirable to oscillate the placement or position of placement of weld metal on the surface of the turbine component during the deposition of the first layer of weld metal.

It has been found that the level of hardness of metal adjacent to the fusion line of the HAZ is not usually increased during the deposition of the second and remaining layers of weld metal onto the surface of the turbine component. As a consequence, the levels of amperages used during the deposition of these layers may be higher than the levels of amperage used during the deposition of the first layer. In fact, it has been found that if higher levels of amperage are used during the deposition of the second and remaining layers, the level of hardness of areas whose level was increased during the deposition of the first layer of weld metal may be reduced, which is know as tempering.

It has also been found, however, that the level of hardness of areas whose level was not increased during the deposition of the first layer of weld metal may also be reduced if the level the amperage used during the deposition of the second and remaining levels of weld metal is too high. Reducing the level of hardness of the areas whose hardness was not increased during the deposition of the first layer of weld metal overtempers or softens these areas. Overtempering or softening an area of ferrous NiMoV low alloy steel reduces its creep strength. Thus, the levels of amperage used during the deposition of the second layer of weld metal (and subsequent layers) are selected to be high enough to temper areas of the HAZ whose level of hardness was increased by the deposition of the first layer of weld metal and selected to be not high enough to overtemper areas of the HAZ whose level of hardness was not increased by the deposition of the first layer of weld metal. In particular, for ferrous NiMoV low alloy steel turbine components, during the deposition of the second layer of weld metal, the amperage should be about 150 amperes for a deposition rate of weld metal of about 20 inches per minute ("IPM") (51 centimeters per minute ("CPM")).

It is also desirable to vary the deposition rate and amperage used during the deposition of the second layer of weld metal. As shown in table 1, in the preferred embodiment, the deposition rate is varied from about 5 IPM (13 CPM) with an amperage of about 100 amperes to a deposition rate of about 20 IPM (51 CPM) with an amperage of about 150 amperes. In addition, it is also desirable to oscillate the placement or position of placement of weld metal on the surface of the turbine component during the deposition of the second layer of weld metal.

In the preferred embodiment of the invention, the deposition rate and amperage used during the deposition of the first, four layers of weld metal is varied. Table 1 depicts the deposition rates used varied during the deposition of the third and fourth layers of weld metal. In addition, the placement or position of placement of weld metal on the surface of the turbine component is oscillated during the deposition of the third and fourth layers of weld metal.

The rate of deposition of weld metal during the deposition of the fifth and remaining layers of weld metal is not varied. In addition, it is not necessary or desirable to oscillate the placement or position of placement of weld metal on the surface of the turbine component during the deposition of the fifth and remaining layers of weld metal. It is desirable, however, to vary the amperage rate during the deposition of the fifth through ninth layers of weld metal.

After the deposition of the ninth layer of weld metal, the remaining layers of the process, layers 10 to 14, are deposited using a fixed level of amperage and a fixed deposition rate of weld metal. The fixed rate of amperage is about 290 amperes and the fixed deposition rate of weld metal is about 26 IPM (66 CPM). As noted above, after the completion of the process of the present invention, i.e., the deposition of the 14 layers of weld metal, normal weld methods may be used to deposit additional weld metal to create the build-up of weld metal needed to repair or replace a segment or section of the surface of the ferrous NiMoV low alloy steel turbine component. After the build-up of weld metal is complete, the component may be subject to postweld heat treatment, such as heat treatment at a temperature of 1200° F. (649° C.) for ten hours. Thereafter, the build-up of the weld metal be machined into the shape of configuration of the replaced or repaired segment of the turbine component.

Figure 6:
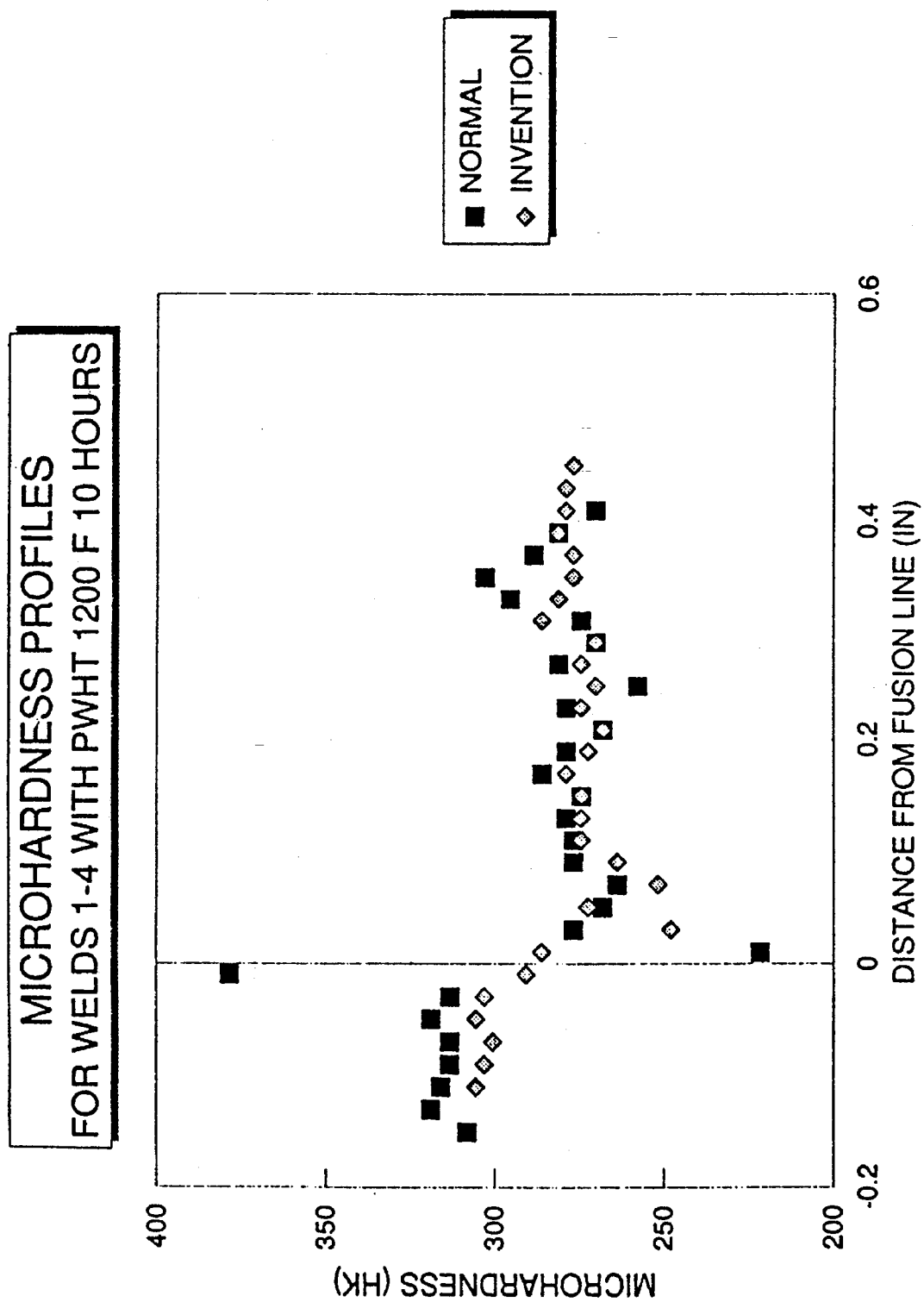
FIG. 6 is a chart delineating the level of hardness measured in areas around fusion lines of ferrous NiMoV low alloy steel turbine components repaired using a normal process and a process according to the present invention.

Comparisons of the levels of hardness of ferrous NiMoV low alloy steel turbine components repaired using normal welding processes and the process of the present invention are presented with reference to FIG. 6. Measurements of the microhardness of NiMoV steam turbine components at different positions about line of fusions were taken for turbine components repaired using normal welding processes and processes according to the present invention. FIG. 6 depicts the measurements plotted as a function of the distance from a fusion line and the microhardness (HK) of the metal (1 Rc is approximately equal to 10.7 (HK)).

As shown in FIG. 6, the normal welding process produces levels of hardness in a ferrous NiMoV low alloy steel turbine component which vary dramatically about the line of fusion. The measured microhardness on one side of the fusion line of the weld is about 380 HK (36 Rc) and about 220 HK (20.6 Rc) at the other side of the fusion line. First, the high level of hardness, 36 Rc, could lead to cracking. Second, the low level of hardness, 20.6 Rc, could reduce the creep strength of the ferrous NiMoV low alloy steel turbine component.

Third, the large differential in hardness about the fusion line, 15.4 Rc (36–20.6 Rc), may reduce the high temperature mechanical properties of the ferrous NiMoV low alloy steel turbine component.

As also shown in FIG. 6, the welding process according to the present invention produces levels of hardness in a ferrous NiMoV low alloy steel turbine component which do not vary significantly about the line of fusion. The measured microhardness on one side of the fusion line of the weld is about 285 HK (26.6 Rc) and about 280 HK (26.2 Rc) at the other side of the fusion line. The level of hardness about the fusion line is close to the normal level of hardness (268 HK, 25 Rc) for ferrous NiMoV low alloy steel turbine components. Thus, the welding process of the present invention is not likely to lead to cracking, reduce the creep strength, or reduce the high temperature mechanical properties of a ferrous NiMoV low alloy steel turbine component.

Although the invention has been described in terms of an exemplary embodiment, the spirit and scope of the appended claims are unlimited by any details not expressly stated in the claims.

What is claimed is:

1. A method of repairing a surface of a ferrous NiMoV low alloy metal steam turbine component, comprising:
   (a) depositing a first layer of weld metal on the surface using first levels of amperage, the first levels of amperage being selected to prevent a substantial increase in a level of hardness of a heat affected zone generated by the deposition of the first layer of weld metal; and
   (b) depositing a second layer of weld metal onto the first layer using second levels of amperage, the second levels of amperage being greater than corresponding first levels of amperage and being selected high enough to temper the heat affected zone and being selected low enough to not overtemper the heat affected zone.

2. The method of claim 1 wherein gas tungsten arc welding is used to deposit the first and second layers of weld metal.

3. The method of claim 1 wherein placement of the weld metal is oscillated during the deposition of the first layer of weld metal.

4. The method of claim 3 wherein placement of the weld metal is oscillated during the deposition of the second layer of weld metal.

5. The method of claim 4 wherein a rate of deposition of weld metal is varied during the deposition of the first layer of weld metal.

6. The method of claim 5 wherein a rate of deposition of weld metal is varied during the deposition of the second layer of weld metal.

7. The method of claim 1 wherein a rate of deposition of weld metal is varied between a first rate of deposition and a second rate of deposition during the deposition of the first layer of weld metal, the second rate of deposition being greater than the first rate of deposition.

8. The method of claim 7 wherein a rate of deposition of weld metal is varied between a third rate of deposition and fourth rate of deposition during the deposition of the second layer of weld metal, the fourth rate of deposition being greater than the third rate of deposition.

9. The method of claim 8 wherein the second rate of deposition of weld metal is greater than the fourth rate of deposition.

10. The method of claim 7 wherein the first levels of amperage consist of a third and a fourth level of amperage, the fourth level of amperage being greater than the third rate of amperage.

11. The method of claim 10 wherein the second levels of amperage consist of a fifth and a sixth level of amperage, the sixth level of amperage being greater than the fifth rate of amperage, the sixth level of amperage being greater than the fourth level of amperage, and the fifth level of amperage being greater than the third level of amperage.

12. The method of claim 11 wherein the first rate of deposition of weld metal is used with the third level of amperage, the second rate of deposition of weld metal is used with the fourth level of amperage, the third rate of deposition of weld metal is used with the fifth level of amperage, and the fourth rate of deposition of weld metal is used with the sixth level of amperage.

13. The method of claim 12 wherein the first rate of deposition of weld metal is about 2 to 8 inches per minute (IPM) (5 to 20 centimeters per minute (CPM)) and the second rate of deposition of weld metal is about 20 to 30 IPM (51 to 76 CPM).

14. The method of claim 13 wherein the third rate of deposition of weld metal is about 2 to 8 IPM (5 to 20 CPM) and the fourth rate of deposition of weld metal is about 15 to 25 IPM (38 to 64 CPM).

15. The method of claim 14 wherein the third level of amperage is about 50 to 120 amperes and the fourth level of amperage is about 85 to 155 amperes.

16. The method of claim 15 wherein the fifth level of amperage is about 65 to 135 amperes and the sixth level of amperage is about 115 to 185 amperes.

17. The method of claim 14 wherein the third level of amperage is about 65 to 105 amperes and the fourth level of amperage is about 100 to 140 amperes.

18. The method of claim 17 wherein the fifth level of amperage is about 80 to 120 amperes and the sixth level of amperage is about 130 to 170 amperes.

19. The method of claim 12 wherein the first rate of deposition of weld metal is about 5 inches per minute (IPM) (13 centimeters per minute (CPM)), the second rate of deposition of weld metal is about 25 IPM (64 CPM), the third level of amperage is about 85 amperes and the fourth level of amperage is about 120 amperes.

20. The method of claim 19 wherein the third rate of deposition of weld metal is about 5 IPM (13 CPM), the fourth rate of deposition of weld metal is about 20 IPM (51 CPM), the fifth level of amperage is about 100 amperes and the sixth level of amperage is about 150 amperes.

21. A method of repairing a surface of a ferrous low alloy metal steam turbine component, comprising:
   (a) depositing a first layer of weld metal on the surface using first levels of amperage, the first levels of amperage being selected to prevent a substantial increase in a level of hardness of a heat affected zone generated by the deposition of the first layer of weld metal;
   (b) depositing a second layer of weld metal onto the first layer using second levels of amperage, the second levels of amperage being greater than corresponding first levels of amperage and being selected high enough to temper the heat affected zone and being selected low enough to not overtemper the heat affected zone;
   (c) varying a rate of deposition of the first layer of weld metal between a first rate of deposition and a second rate of deposition, the second rate of deposition being greater than the first rate of deposition; and
   (d) wherein the first levels of amperage consist of a third and fourth level of amperage, the fourth level of amperage being greater than the third level of amperage, and the second levels of amperage consist of a fifth and sixth level of amperage, the sixth level of amperage being greater than the fifth level of amperage, the sixth level of amperage being greater than the fourth level of amperage, and the fifth level of amperage being greater than the third level of amperage.

22. A method of repairing a surface of a ferrous low alloy metal steam turbine component, comprising:

(a) depositing a first layer of weld metal on the surface using first levels of amperage, the first levels of amperage being selected to prevent a substantial increase in a level of hardness of a heat affected zone generated by the deposition of the first layer of weld metal;

(b) depositing a second layer of weld metal onto the first layer using second levels of amperage, the second levels cf amperage being greater than corresponding first levels of amperage and being selected high enough to temper the heat affected zone and being selected low enough to not overtemper the heat affected zone; and (c) wherein said first levels of amperage further comprise a third and fourth level of amperage, the fourth level of amperage being greater than the third level of amperage, and said second levels of amperage further comprise a fifth and sixth level of amperage, the sixth level of amperage being greater than said fourth and fifth levels of amperage, and the fifth level of amperage being greater than the third level of amperage.

* * * * *